United States Patent [19]
Barber

[11] Patent Number: 5,650,757
[45] Date of Patent: Jul. 22, 1997

[54] IMPEDANCE STEPPING FOR INCREASING THE OPERATING SPEED OF COMPUTER BACKPLANE BUSSES

[75] Inventor: V. Alan Barber, San Jose, Calif.

[73] Assignee: Hewlett-Packard Company, Palo Alto, Calif.

[21] Appl. No.: 624,015

[22] Filed: Mar. 27, 1996

[51] Int. Cl.$^6$ ...................................................... H01P 5/12
[52] U.S. Cl. .......................... 333/128; 326/30; 370/421; 395/307
[58] Field of Search ..................... 333/124, 125, 333/127, 128, 32–34; 326/30; 370/85.1, 480, 489, 420, 421; 395/281, 307

[56] References Cited

U.S. PATENT DOCUMENTS

| | | |
|---|---|---|
| 4,947,144 | 8/1990 | Le Nohaic ........................ 333/128 |
| 5,274,671 | 12/1993 | Johnson ........................... 333/32 X |
| 5,568,063 | 10/1996 | Takekuma et al. ............... 326/30 |

*Primary Examiner*—Paul Gensler

[57] ABSTRACT

A computer interconnection backplane bus. The interconnection backplane bus is formed by bus transmission lines and component connection transmission line sections that interconnect components of the computer. The characteristic impedance of the bus transmission lines is stepped so that the number of impedance mismatches on the interconnection bus is minimized. The components of the computer are connected to the bus at the interconnections nodes of the bus transmission lines through terminated component connection transmission line sections. The impedance mismatches that exist on the interconnection backplane bus are strategically placed so that the distortion to a transitioning voltage level edge is in the form of overshoot rather than under shoot or ringing.

9 Claims, 11 Drawing Sheets

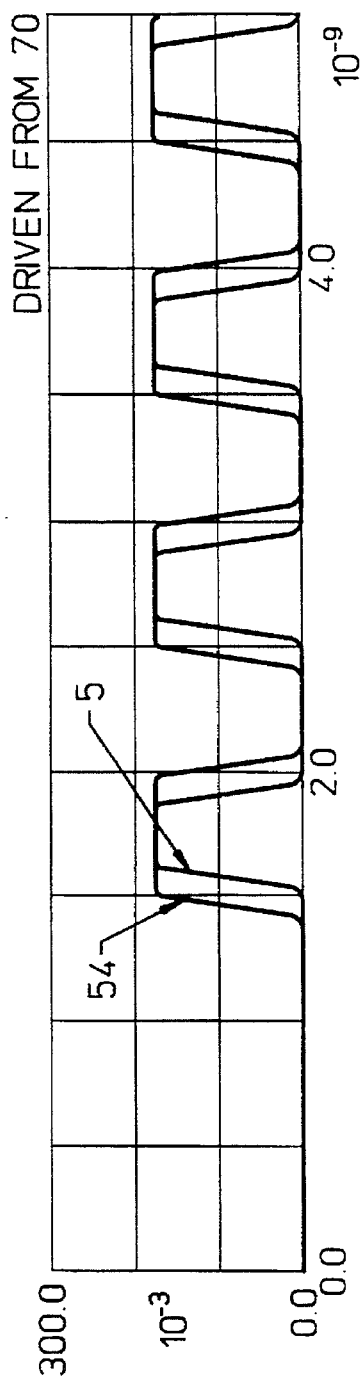
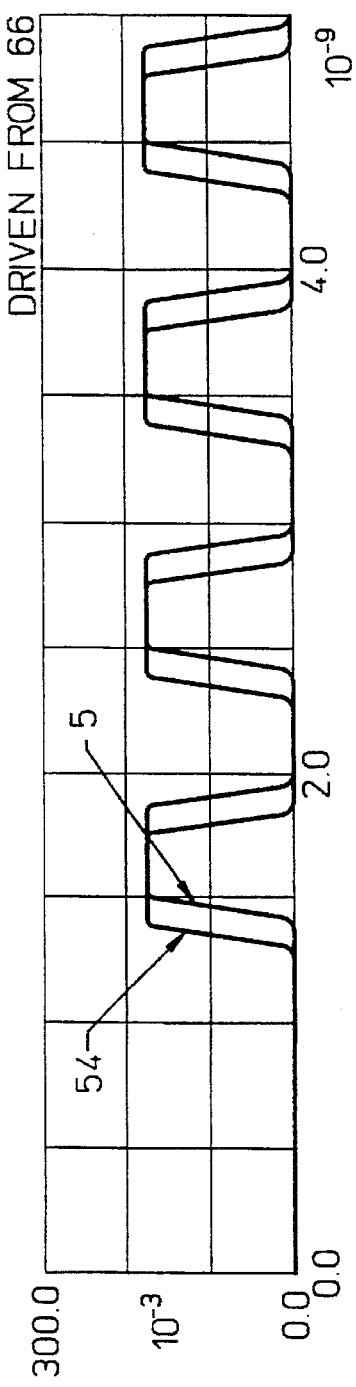
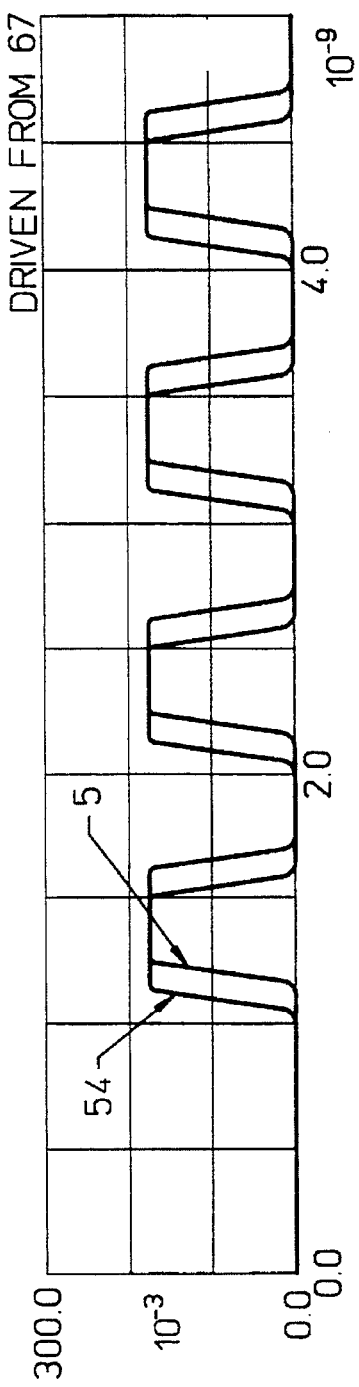
Figure 9A
Figure 9B
Figure 9C

IMPEDANCE STEPPING FOR INCREASING THE OPERATING SPEED OF COMPUTER BACKPLANE BUSSES

FIELD OF INVENTION

This invention relates generally to interconnect busses. In particular, it relates to selecting node terminations and stepping the characteristic impedance of transmission lines of the interconnection bus for allowing higher operating speeds.

BACKGROUND

High performance computers generally have an interconnect backplane. The interconnect backplane provides an interconnection path between various components of the computer. Typically, about 5–6 components are interconnected. The components may be microprocessors, memory or other computer associated circuitry.

FIG. 1 shows a computer interconnect backplane 10. The interconnect backplane 10 is typically a printed circuit board. The interconnect backplane 10 has a bus 12 which interconnects components 14, 15, 16, 17, 18, 19 of the computer. Each of the components can include integrated circuits (ICs) such as an IC 20 attached to component 14. Typically, a matched impedance 22 is attached to both ends of the bus 12.

The speed of the microprocessors and memory connected to the interconnection backplane is constantly increasing. As the speed of the circuitry increases, parasitic capacitance and impedance mismatches on the interconnection bus 12 begin to affect the integrity of the signals traveling on the bus from one component to another. As a result, the technology used to implement the interconnection backplane must evolve as the components connected to the backplane operate at faster speeds.

Presently, computer interconnection backplanes are implemented as suggested by the circuit schematic shown in FIG. 2. The bus is implemented with bus transmission lines 24, 25, 26, 27, 28 that interconnect the components attached to the bus at a series of node interconnect points 0, 1, 2, 3, 4, 5. The bus transmission lines can be implemented with microstrip or stripline, and have a characteristic impedance of $Z_o$. Termination impedance loads 36, 37 are located at the two end nodes 0, 5. The components 30, 31, 32, 33, 34, 35 connected to the nodes are devices that are either in a driver mode or in a listener mode. Only a single one of the components 30, 31, 32, 33, 34, 35 may be in driver mode at a time. If a component is in driver mode then that component determines the voltage level of the interconnection bus. The driver component can be in one of two states. The driver component sets the voltage level of the bus to one of two voltage levels in which a voltage level corresponds to each state. If a component is in listener mode then that component is receiving the voltage level of the bus. The components 30, 31, 32, 33, 34, 35 in FIG. 2 are represented by input/output (I/O) devices. A component 32 is the driver device and has a low output impedance of typically less than 10 ohms. All of the other components (I/Os) 30, 31, 33, 34, 35 are depicted as listener devices and have high input impedances.

In operation, the interconnection bus operates as follows. When the driver component 32 transitions from one of two states to the other, a rising or falling edge propagates down the bus transmission lines 24, 25, 26, 27, 28 as the voltage level on the bus switches from one level to another. Each listener component 30, 31, 33, 34, 35 receives the new voltage level corresponding to the new state of the driver component as the rising or falling edge reaches the listener component. The rising or falling edge propagates to the end of the bus and is terminated because of the presence of the termination impedance loads 36, 37. The termination impedance loads 36, 37 are matched to the characteristic impedance of the bus transmission lines so that the rising or falling edges are not reflected upon reaching the termination impedance loads 36, 37.

This operation is illustrated through transient simulation of the circuit. FIG. 3 shows the results of the simulation in which $Z_o$ is 50 ohms, the driver has an output impedance of 10 ohms and an open circuit output voltage of 1 volt, each bus transmission line 24, 25, 26, 27, 28 is 300 picoseconds long, and the edge risetime is 100 picoseconds. Traces 3A, 3B and 3C show time lines of the voltage levels received by the listener components when the driver component is attached to nodes 0, 1 and 2.

Trace 3A of FIG. 3 shows the voltage level at each of the nodes 1, 2, 3, 4, 5 when the first component 30 is the driver component and transitions from a low voltage level (about 0 Volts) to a high voltage level (about 0.8 Volts). The voltage levels of the nodes 1, 2, 3, 4, 5 transition from the low voltage to the high voltage as the rising edge of the driver transition reaches each node. Trace 3B of FIG. 3 shows the voltage level at each of the nodes 0, 2, 3, 4, 5 when the second component 31 is the driver component. The voltage levels of the nodes 0, 2, 3, 4, 5 transition from the low voltage to the high voltage as the rising edge of the driver transition reaches each node. Trace 3C of FIG. 3 shows the voltage level at each of the nodes 0, 1, 3, 4, 5 when the third component 32 is the driver component. The voltage levels of the nodes 0, 1, 3, 4, 5 transition from the low voltage to the high voltage as the rising edge of the driver transition reaches each node.

The driver component changes state producing a rising or falling edge. The edge propagates down both directions of the bus away from the driving component and each listener component receives the transition in states. The edges propagate to each end of the bus and terminate with no reflections.

Difficulties arise when the listener components connected to the receiving nodes do not have a high input impedance. The listener components can have substantial parasitic capacitance due to the fact that the listener components are not connected directly to the nodes on the bus. Generally, the components are connected to the bus through connectors, IC sockets, printed circuit boards and other electrical connection devices.

Typically, the components are connected to the nodes of the bus through conductive component connection transmission line sections. The component connection transmission line sections may have a characteristic impedance that is the same as the characteristic impedance of the bus transmission lines. Therefore, impedance mismatches can occur at each node where the component connection transmission line sections make electrical contact with the bus transmission line sections. As the frequency of the transitions from the driver component increases the risetime of transition edges decreases and impedance mismatches have a greater effect on the integrity of the voltage transitions received by the listener components. Component connection transmission line sections that are tolerable with transitions of 1 nanosecond may be intolerable in faster systems. The component connection transmission line sections become "visible" when the electrical length of the component connection transmission line section is on the order of the risetime of the transition edge.

FIG. 4 is a circuit schematic that represents a typical backplane bus with component connection transmission line sections 41, 42, 43, 44 connecting components 31, 32, 33, 34 to the bus at nodes 51, 52, 53, 54, and bus transmission lines 24, 28 connecting components 30, 35 to the bus at nodes 0 and 5. The arrows on FIG. 4 depict where the impedance mismatches within the backplane interconnection bus are located. At each impedance mismatch, a reflection will occur if a high speed rising or falling voltage transitional edge propagates into the impedance mismatch. The mismatches are located so that a single edge may reflect back and forth between impedance mismatches causing tinging. The ringing will cause the interconnection bus to take a longer period of time to reach a static voltage level.

FIG. 5 shows the results of a transient simulation of the circuit schematic of FIG. 4 in which $Z_o$ is 50 ohms, the driver has an output impedance of 10 ohms and an open circuit output voltage of 1 volt, each bus transmission line 24, 25, 26, 27, 28 is 300 picoseconds long, each component connection transmission line sections 41, 42, 43, 44 is 200 picoseconds long, and the edge risetime is 100 picoseconds. Traces 5A, 5B and 5C show time lines of the voltage levels received at nodes 54 and 5 when the driver component is components 30, 31, 32.

Trace 5A shows the voltage levels received at nodes 54 and 5 when the driver component is component 30. The two waveforms depict the delay as the voltage transition of the driver travels down the interconnection bus. The two waveforms also show the distortion of the voltage transition due to the additive and subtractive components of the reflected components of the voltage transition as the transition encounters impedance mismatches on the interconnection bus. Trace 5B shows the voltage levels received at nodes 54 and 5 when the driver component is component 31. Trace 5C shows the voltage levels received at nodes 54 and 5 when the driver component is component 32.

Traces 5A, 5B and 5C show that the voltage levels at all nodes and connection points on the interconnection bus take longer to reach a static state when the driver component operates with a rise or fall time equal to or less than the electrical length of the bus transmission line sections 24, 25, 26, 27, 28 and the component connection transmission line sections 41, 42, 43, 44. The distortion to voltage transitions on the interconnection bus due to the impedance mismatches on the interconnection bus reduces the rate at which, the voltage transitions can occur since each voltage transition must be substantially settled at a receiving node before subsequent transitions arrive in order to avoid bit errors. The rate limitation reduces the frequency at which signals on the interconnection bus can be usefully coupled between components connected to the interconnection bus.

The operating frequencies of the components connected to computer interconnection backplanes are constantly increasing. Therefore, new configurations and new methods of fabricating computer interconnection backplanes must be developed.

SUMMARY OF THE INVENTION

The present invention is a computer interconnection backplane configuration which can operate at significantly higher frequencies than presently possible. This invention provides a systematic method of selecting the characteristic impedance of transmission lines within the bus of the interconnection backplane. The selection of the characteristic impedances provides minimal transient distortion of voltage pulses propagating down the transmission lines of the bus.

A first embodiment of this invention includes an interconnect bus having a plurality of N bus transmission line sections. The bus transmission line sections include a first bus transmission line end section and a second bus transmission line end section. The plurality of N bus transmission line sections are connected in series with the first bus transmission line end section at one end and the second bus transmission line end section at the other end. The first bus transmission line end section and the second bus transmission line end section have a characteristic impedance of $Z_o$. The characteristic impedance of the N bus transmission line sections progresses down in value from a maximum impedance at the first bus transmission line end section and the second bus transmission line end section, to a minimum impedance at a middle region. A plurality of nodes are formed by the connections between the bus transmission line sections, and an unconnected end of the first bus transmission line end section and an unconnected end of the second bus transmission line end section. Finally, this embodiment includes a plurality of up to (N+1) computer interconnect components. Each computer interconnect component is electrically connected to a unique one of the nodes, and has a component load impedance.

For a second embodiment of this invention, one of the plurality of computer interconnect components of the first embodiment is a driver component. The driver component determines the voltage level of the backplane bus.

For a third embodiment of this invention, each computer interconnect component of the first embodiment is electrically connected to a unique one of the plurality of nodes through a component connection transmission line section. The characteristic impedance of the component connection transmission line section is substantially equal to $Z_o$.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 9 shows waveforms of another simulation of the circuit of FIG. 6.

DETAILED DESCRIPTION

Figure 1:
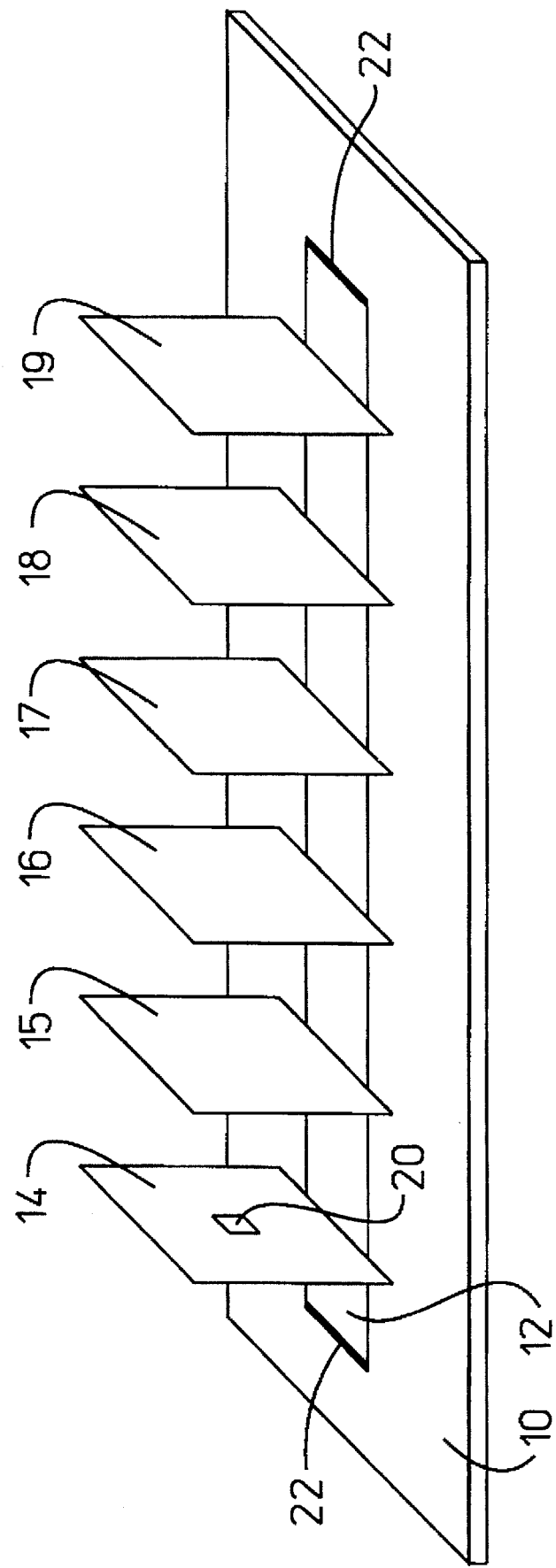
FIG. 1 shows a standard computer interconnection backplane.
Figure 2:
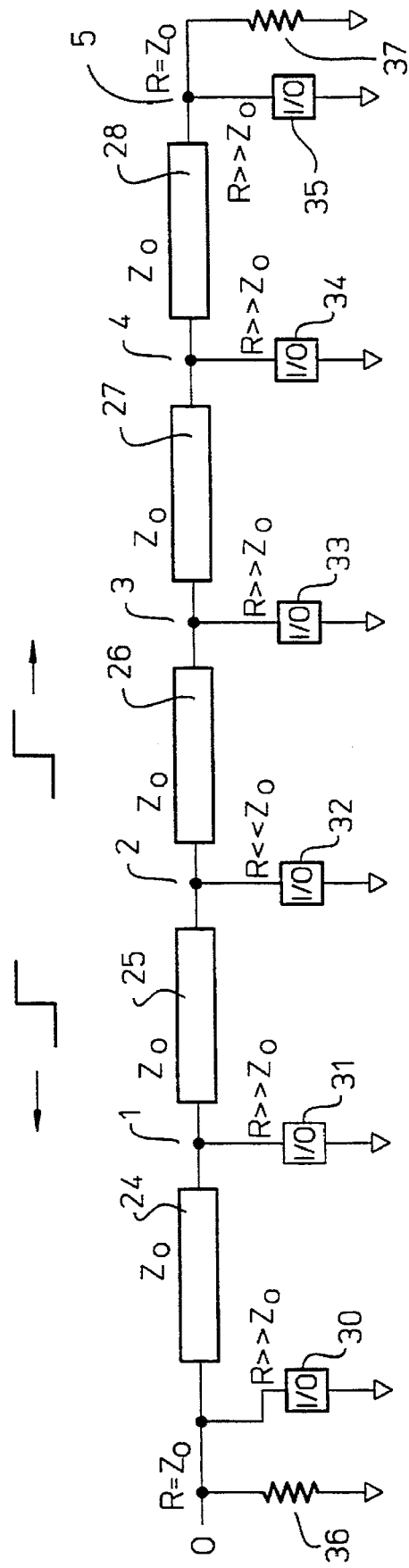
FIG. 2 is a circuit schematic of the standard computer interconnection backplane of FIG 1.

As shown in the drawings for purposes of illustration, the invention is embodied in a computer interconnect backplane configuration. The configuration includes stepping the characteristic impedance of the interconnect bus between connection points, and terminating the interconnection component connection transmission line sections. The computer interconnect backplane configuration according to the invention provides better high frequency interconnection performance than previously possible.

Figure 6:
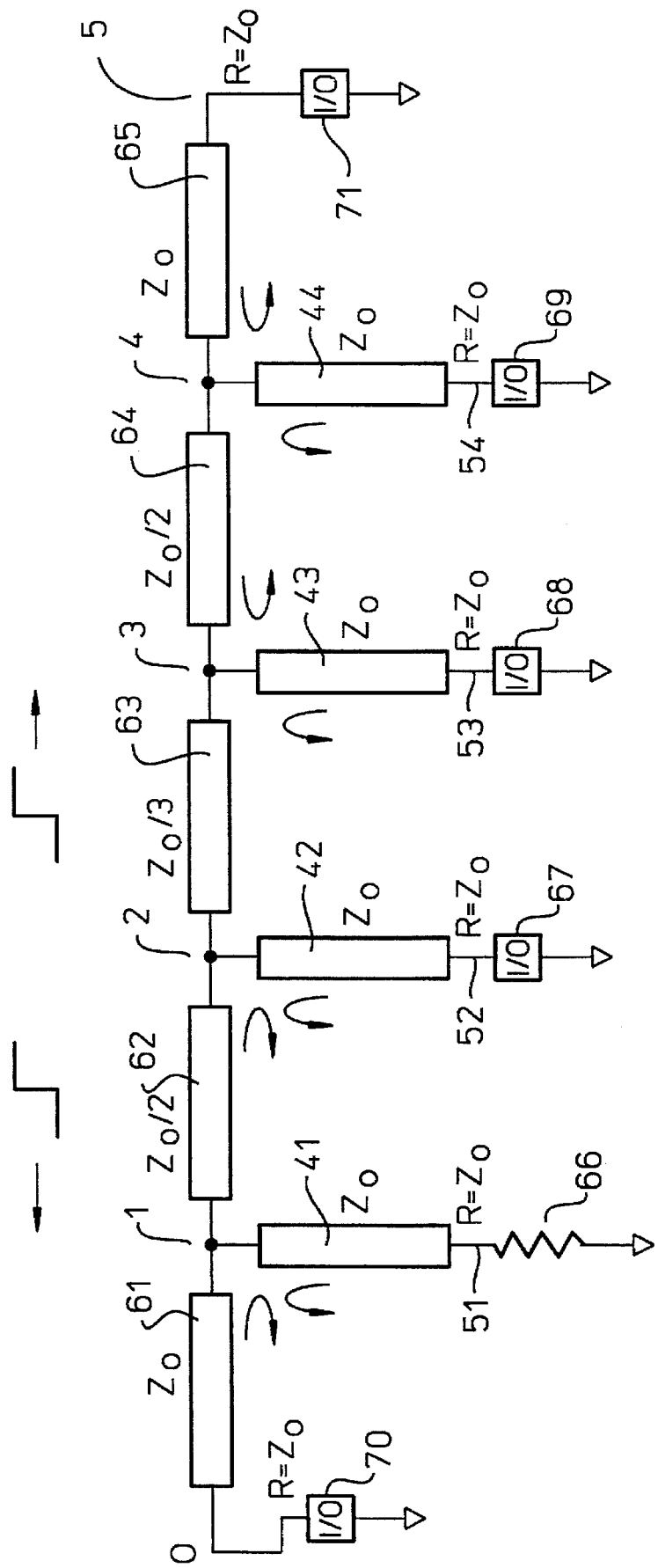
FIG. 6 is a circuit schematic of an embodiment of this invention.

FIG. 6 is a circuit schematic of an embodiment of this invention. This schematic shows six components connected to the interconnection backplane bus at six nodes 0, 1, 2, 3, 4, 5. The bus includes five bus transmission line sections 61, 62, 63, 64, 65 that interconnect the nodes 0, 1, 2, 3, 4, 5. The characteristic impedance of the bus transmission line sections 61, 62, 63, 64, 65 is stepped. Each of the components 66, 67, 68, 69, 70, 71 are at the end of a component connection transmission line section 41, 42, 43, 44 with a characteristic impedance of $Z_o$, or at the end of the end bus transmission lines sections 61, 65 which also have a characteristic impedance of $Z_o$. Each of the component connection transmission line sections 41, 42, 43, 44 and the end bus transmission line sections 61, 65 are terminated with a component 66, 67, 68, 69, 70, 71 having an input resistance substantially equal to the characteristic impedance $Z_o$. The terminations provided by the input resistance of the components 66, 67, 68, 69, 70, 71 substantially eliminates the mismatch between the transmission line sections 41, 42, 43, 44, 61, 65 and the components 66, 67, 68, 69, 70, 71.

In FIG. 6, component 66 is a termination having a termination load impedance of $Z_o$.

The characteristic impedance of the middle bus transmission line section 63 is $Z_o/3$. The characteristic impedance of bus transmission line sections 62, 64 which share nodes with the middle bus transmission line section 63 is $Z_o/2$. The characteristic impedance of the end bus transmission line sections 61, 65 is $Z_o$.

Figure 4:
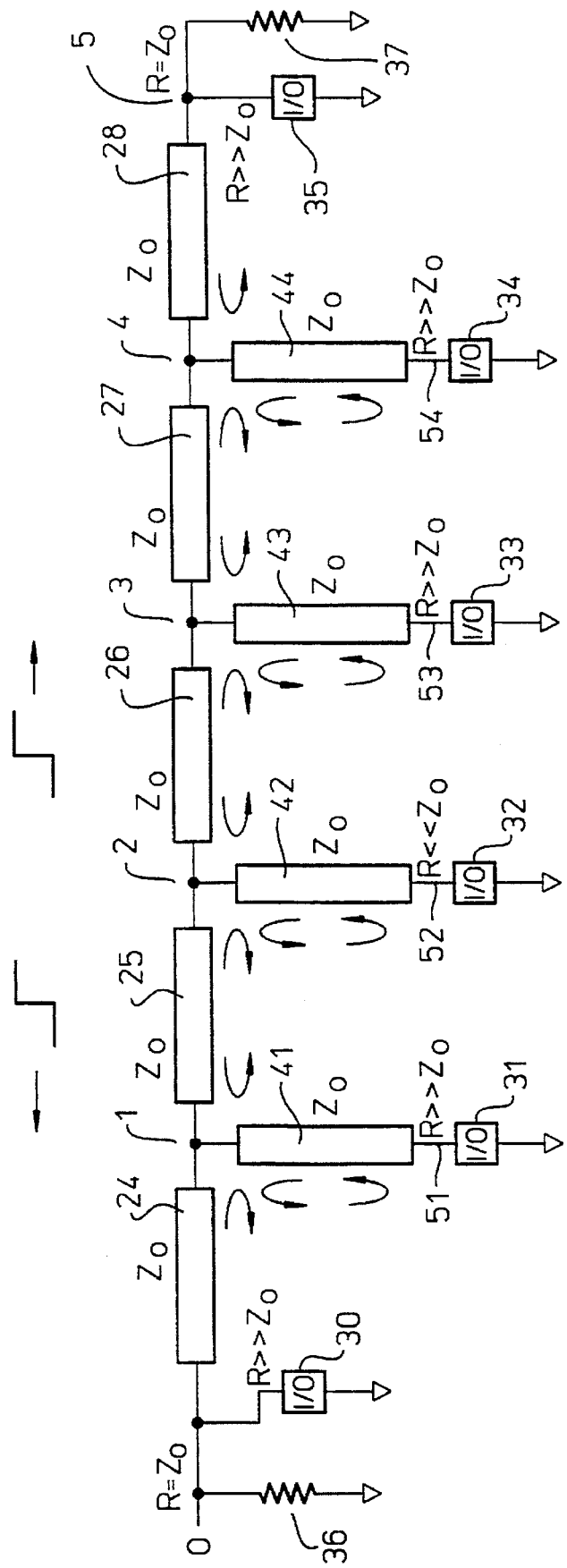
FIG. 4 is a circuit schematic of the standard computer interconnection backplane of FIG. 1 in which interconnect component connection transmission line sections connect the components to the bus.

The stepped characteristic impedance configuration transmission line sections and the termination resistance provided by the components connected to the interconnection bus of this invention reduces the number of impedance mismatches within the interconnections of the bus. The arrows in FIG. 6 indicate where the impedance mismatches within the backplane bus of this invention are located. The number of impedance mismatches in FIG. 6 is significantly less than the number of impedance mismatches of the prior art as shown in FIG. 4.

With the circuit configuration as shown in FIG. 6 there are no possibilities for multiple reflections of the same transitioning voltage edge. That is, if an edge is reflected at an impedance mismatch, that reflected edge will not encounter another impedance mismatch before being terminated. In fact, for the configuration shown in FIG. 6, the reflected edge will never traverse more than two bus transmission line segments before being terminated.

Reflected voltage transitional edges extend the amount of time that it takes the interconnection bus to settle to a final voltage after a driver component has transitioned from one state to another. Here, the transitional voltage reflections are terminated quickly. Therefore, there are not long time delays between the point in time that the driver component changes state and the point in time that the interconnection bus settles to a final voltage.

An additional feature of this invention is that the impedance mismatches on the interconnection bus that do exist are strategically located so that reflections from transitional voltage edges in combination with the impedances of the bus segments produce overshoot on the transitioning voltage of the interconnection bus rather than ringing or undershoot. This is beneficial because the voltage on the bus is more differential upon transitioning from one voltage level to another rather than less. The determination by a listener device as to whether the voltage on the interconnection bus is one voltage state or another is made by comparing the interconnection bus voltage with a threshold voltage. The fact that the reflections that exist add to the transition voltage rather than subtract makes the threshold detection by the listener device simpler and enables a correct detection to be made sooner.

Figure 7:
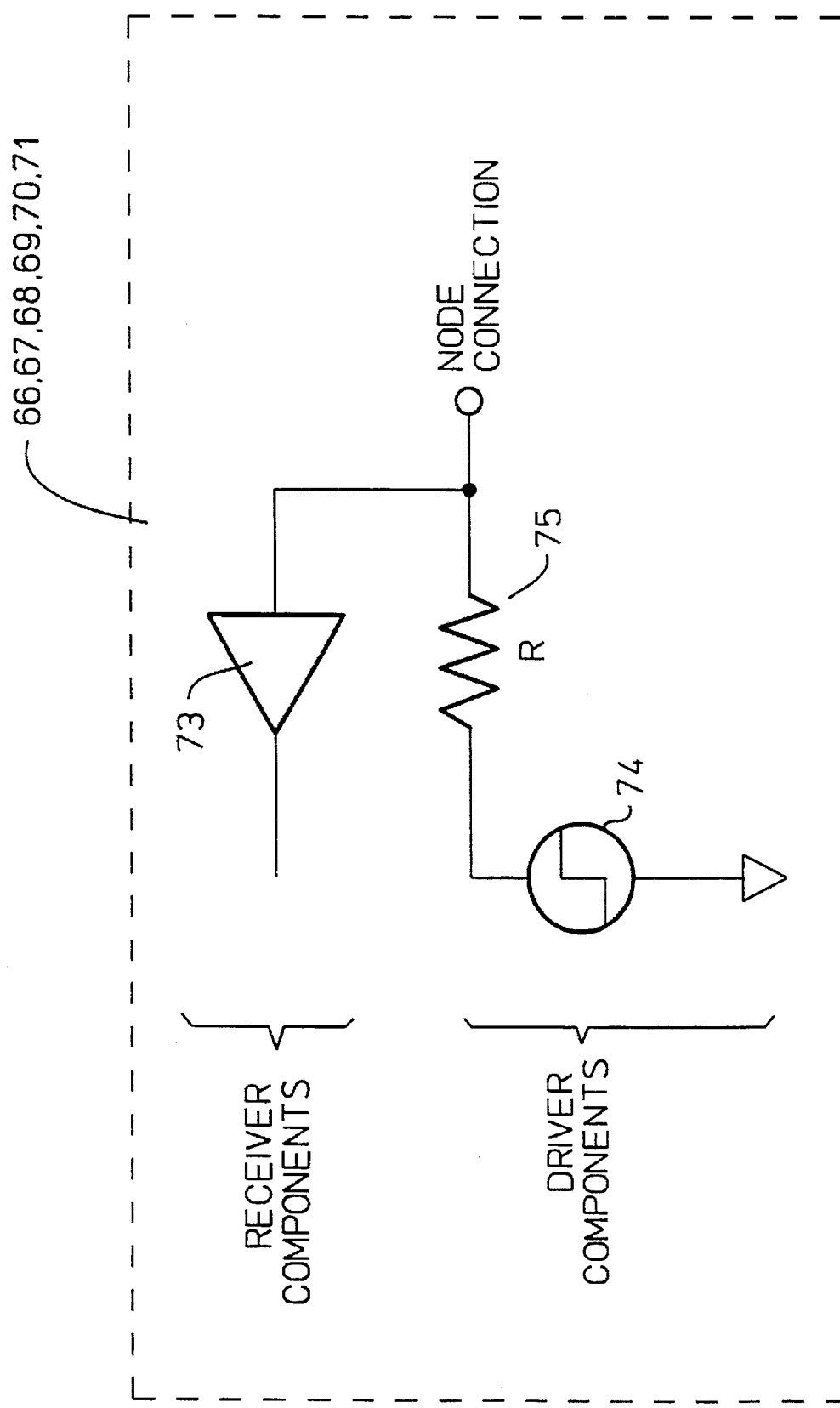
FIG. 7 is a circuit schematic which represents the circuitry within the components electrically connected to the interconnection backplane bus.

FIG. 7 is an equivalent circuit schematic of the components connected to the interconnection bus. As was stated earlier, each component 66, 67, 68, 69, 70, 71 is in either driver mode or listener mode. In either case, the input impedance of each component 66, 67, 68, 69, 70, 71 is matched to the characteristic impedance $Z_o$ of the transmission line sections 41, 42, 43, 44, 61, 65. The receiver component 73 is always in a high input impedance state. The driver component 74 is always in a low impedance state, and is in series with the matching resistance 75. Therefore, the receiver component 73 is in parallel with the matching resistance 75 and the impedance at the node connection is substantially equal to R. The schematic in FIG. 7 is merely an equivalent circuit. Functional equivalents of the circuit in FIG. 7 may be implemented in many different ways.

Figure 3A:
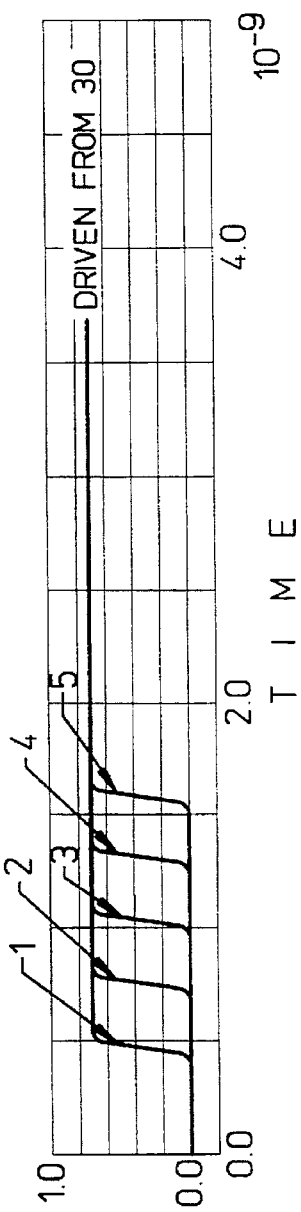
FIG. 3 shows waveforms of a simulation of the circuit of FIG. 2.
Figure 3B:
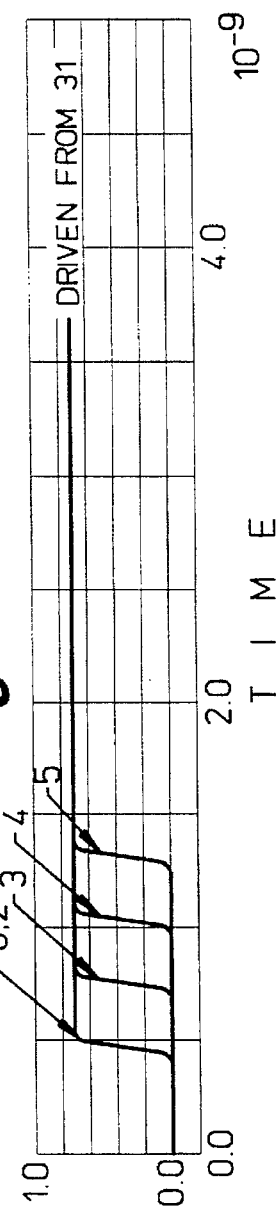
Figure 3C:
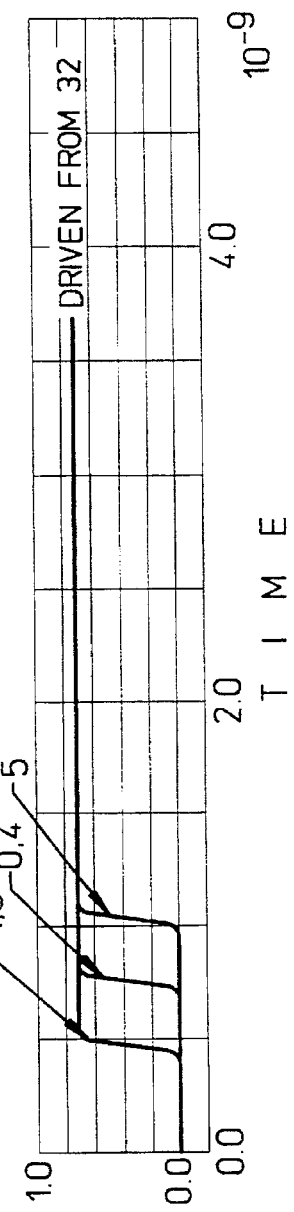
Figure 5A:
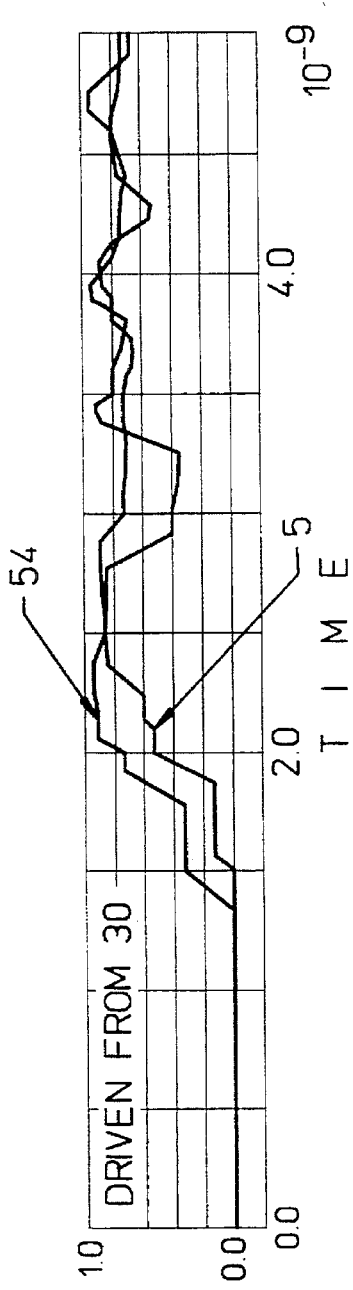
FIG. 5 shows waveforms of a simulation of the circuit of FIG. 4.
Figure 5B:
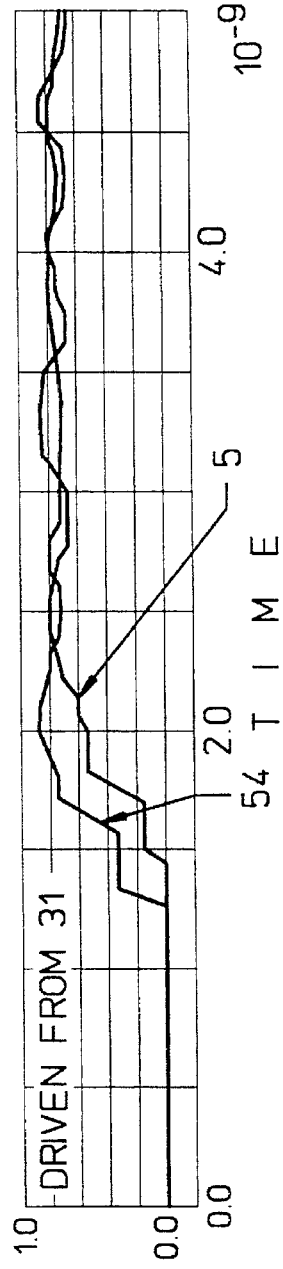
Figure 5C:
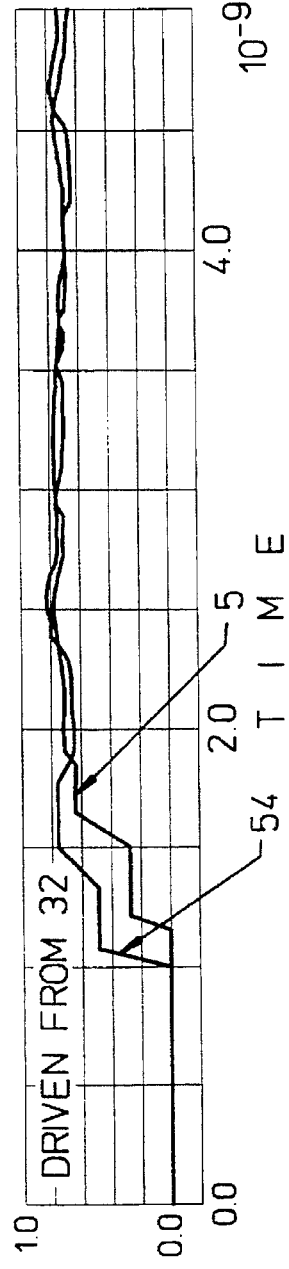
Figure 8A:
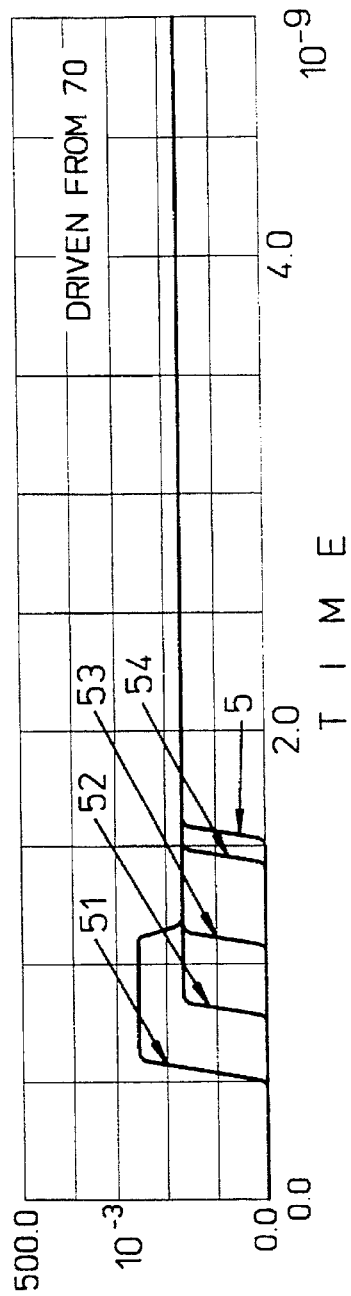
FIG. 8 shows waveforms of a simulation of the circuit of FIG. 6.
Figure 8B:
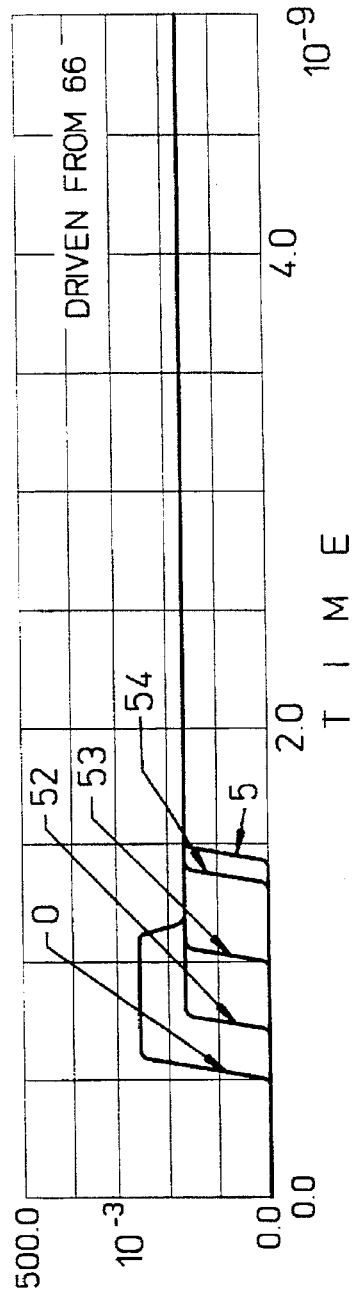
Figure 8C:
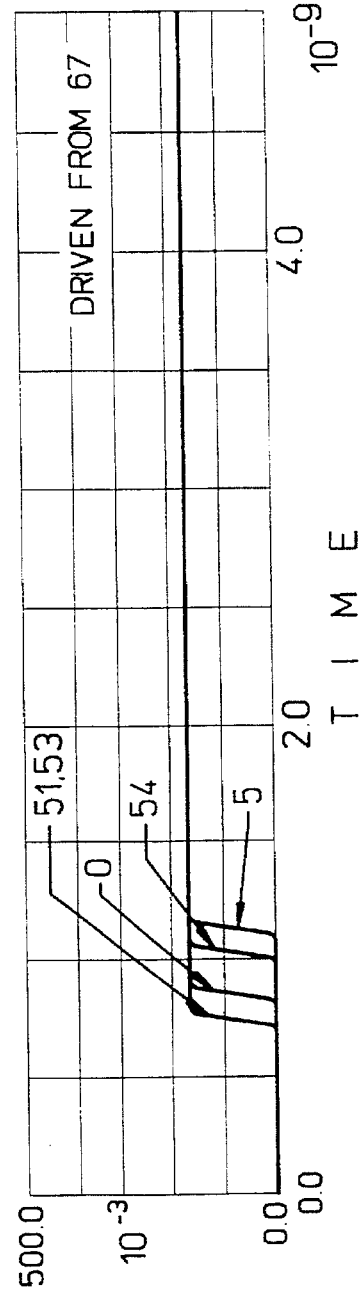

FIG. 8 shows the results of a transient simulation of the circuit schematic of FIG. 6 in which $Z_o$ is 50 ohms, each of the components 66, 67, 68, 69, 70, 71 have an input impedance of 50 ohms, the driver has an open circuit output voltage of 1 volt, each bus transmission line 61, 62, 63, 64, 65 is 300 picoseconds long, each component connection transmission line section 41, 42, 43, 44 is 200 picoseconds long, the characteristic impedance of bus transmission lines sections 62, 64 is 25 ohms, the characteristic impedance of bus transmission line section 63 is 16.7 ohms, and the edge risetime is 100 picoseconds. Traces 8A, 8B and 8C show time lines of the voltage levels received at nodes 0, 5, 51, 52, 53, 54 when the driver component is components 70, 66, 67. The driver component generates a voltage that transitions from a low voltage to a high voltage. The waveforms of FIG. 8 are smaller in amplitude than the waveforms of FIG. 3 and FIG. 5 because the of the presence of the component connection transmission line section termination resistances in the circuit schematic of FIG. 6.

Trace 8A shows the voltage levels on nodes 5, 51, 52, 53, 54 when component 70 is the driving device. The voltage level on node 51 depicts some overshoot. Trace 8B shows the voltage levels on nodes 0, 5, 52, 53, 54 when component 66 is the driving device. The voltage level on node 0 depicts some overshoot. Trace 8C shows the voltage levels on nodes 0, 5, 51, 53, 54 when component 67 is the driving device.

Figure 10A:
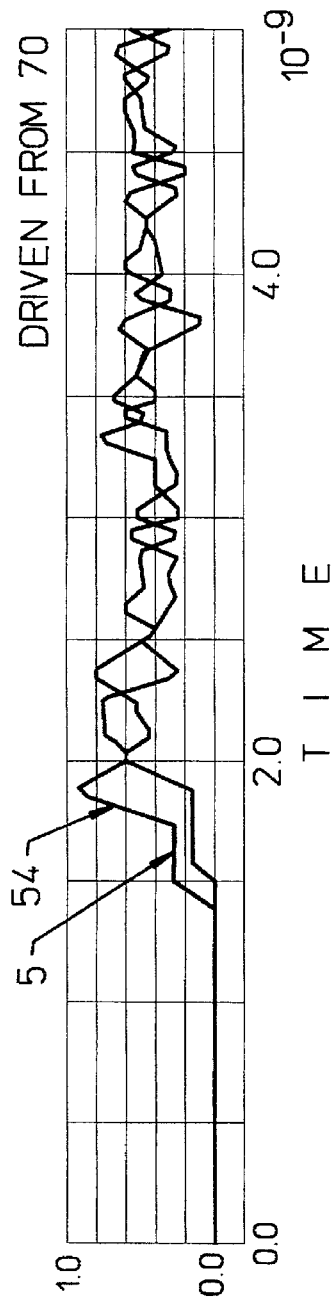
FIG. 10 shows waveforms of another simulation of the circuit of FIG. 4.
Figure 10B:
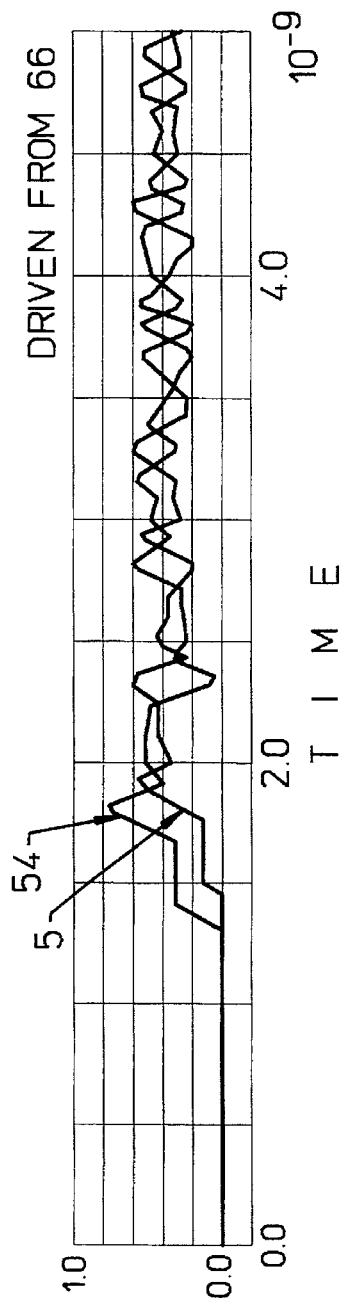
Figure 10C:
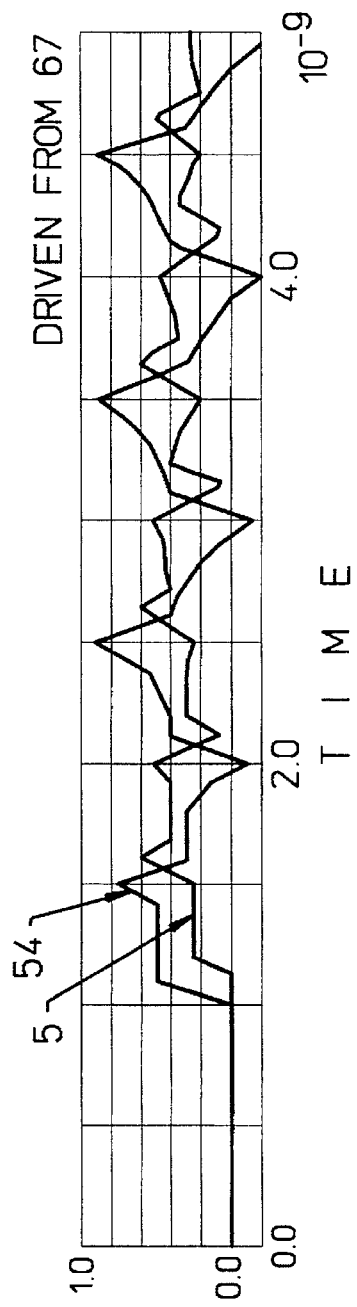
Figure 11:
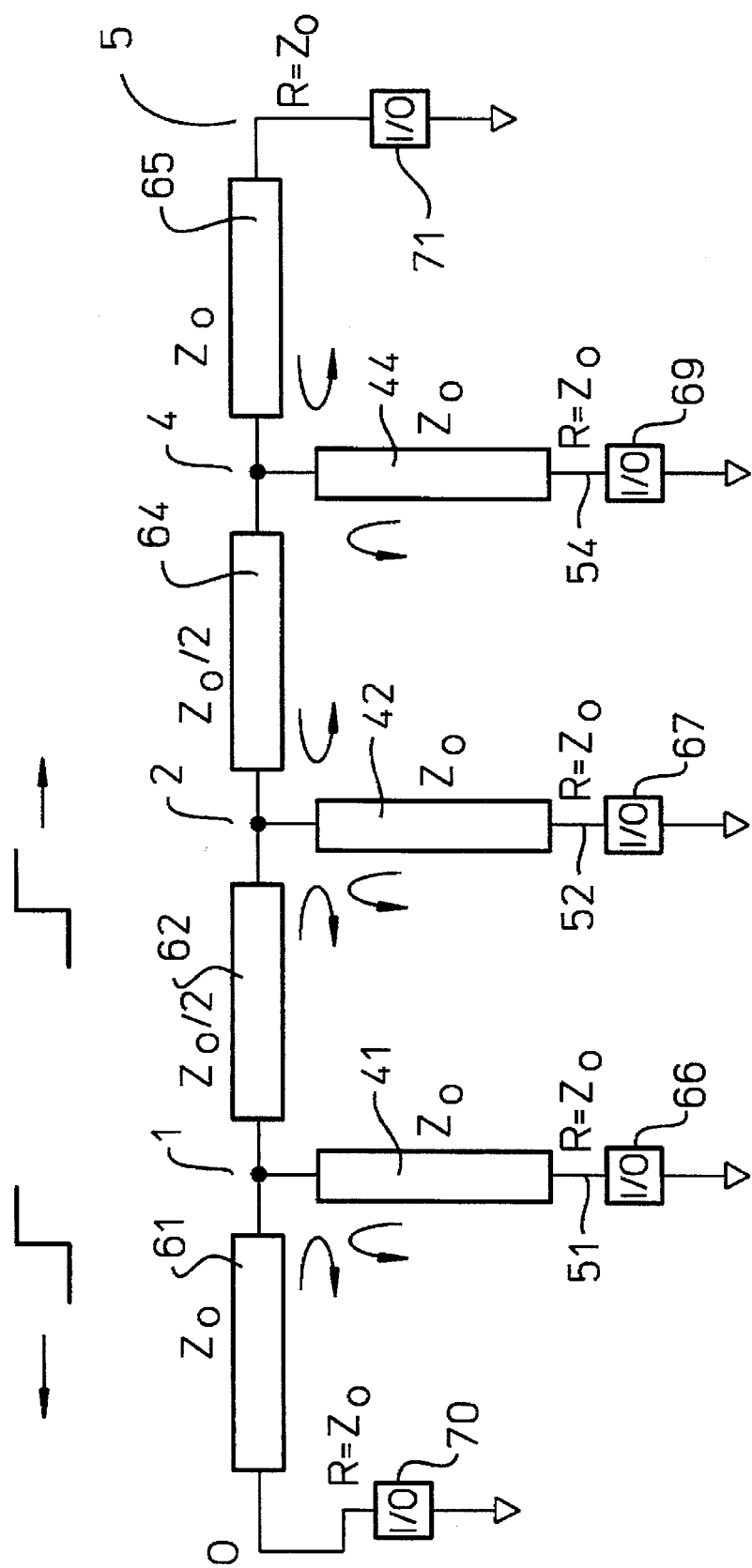
FIG. 11 is a circuit schematic of another embodiment of this invention.

FIG. 9 shows waveforms generated by simulating the circuit schematic of FIG. 6 when the driver component is generating a 2 Gigabit per Second (Gbps) NRZ (non-return to zero) signal (square wave). These waveforms can be contrasted with the waveforms in FIG. 10. FIG. 10 shows waveforms generated by simulating the circuit schematic of FIG. 4 when the driver component is generating a 2 Gigabit per Second (Gbps) NRZ signal (square wave).

Trace 9A of FIG. 9 shows the voltage levels received at nodes 5 and 54 of FIG. 6 when component 70 is the driver component generating a 2 Gbps signal. Trace 9B shows the voltage levels received at nodes 5 and 54 when component 66 is the driver component generating a 2 Gbps signal. Trace 9C shows the voltage levels received at node 5 and 54 when component 67 is the driver component generating a 2 Gbps signal.

Trace 10A of FIG. 10 shows the voltage levels received at nodes 5 and 54 of FIG. 4 when component 70 is the driver component generating a 2 Gbps signal. Trace 10B shows the voltage levels received at node 5 and 54 when component 66 is the driver component generating a 2 Gbps signal. Trace 10C shows the voltage levels received at nodes 5 and 54 when component 67 is the driver component generating a 2 Gbps signal.

The contrast between FIG. 9 and FIG. 10 clearly depicts the superior performance of this invention over the prior art. The waveforms of FIG. 10 are severely distorted due to the interaction of the reflected signals with the signal generated by the driving device.

The embodiments of this invention have been described as having utility in computer systems. However, the concept of interconnecting components through terminated component connection transmission line sections and stepped characteristic impedance transmission lines can be extended to digital and analog electronics in general. Any system that interconnects high frequency signals from one component to another though an interconnection bus can use the principles of this invention to reduce the distortion of the signals due to impedance mismatches on the interconnection bus.

Although specific embodiments of the invention have been described and illustrated, the invention is not to be limited to the specific forms or arrangements of parts so described and illustrated. The invention is limited only by the claims.

We claim:

1. An interconnect bus comprising: a plurality of N bus transmission line sections including a first bus transmission line end section and a second bus transmission line end section, wherein the plurality of N bus transmission line sections are connected in series with the first bus transmission line end section at one end, and the second bus transmission line end section at the other end;

the first bus transmission line end section and the second bus transmission line end section having a characteristic impedance of $Z_o$;

a middle region comprising at least one middle bus transmission line section;

the characteristic impedance of the N bus transmission line sections progressing down in value from a maximum impedance at the first bus transmission line end section and the second bus transmission line end section, to a minimum impedance at the middle region;

a plurality of (N+1) nodes, one node at an unconnected end of the first bus transmission line section, another node at an unconnected end of the second bus transmission line section, and the rest of the plurality of nodes formed by the interconnections between the rest of the plurality bus transmission line sections; and a computer interconnect component electrically connected to one of the plurality of nodes, the computer interconnect component having a component load impedance.

2. The interconnect bus recited in claim 1, further comprising a termination having a termination load resistance, the termination connected to one of the nodes to which the computer interconnect element is not connected.

3. The interconnect bus recited in claim 1, wherein the computer interconnect component is a driver component that determines the voltage level of the bus.

4. The interconnect bus recited in claim 1, wherein the computer interconnect component is electrically connected to the one of the plurality of nodes through a component connection transmission line section, the component connection transmission line section having a characteristic impedance substantially equal to $Z_o$.

5. The interconnect bus recited in claim 1, wherein if N is an odd integer then:

a jth bus transmission line section has a characteristic impedance of ($Z_o/j$), where j=1 for the first bus transmission line end section and the second bus transmission line end section, j=(N+1)/2 for a middle bus transmission line section, and j increments progressively stepping through all of the bus transmission lines sections from the first bus transmission line end section and the second bus transmission line end section towards the middle bus transmission line section, where j is an integer that varies from 1 to (N+1)/2.

6. The interconnect bus recited in claim 1, wherein if N is an even integer then:

a jth bus transmission line section has a characteristic impedance of ($Z_o/j$), where j=1 for the first bus transmission line end section and the second bus transmission line end section, and j=N/2 for a first middle bus transmission line section and a second middle bus transmission line section, and j increments progressively stepping through all of the bus transmission lines sections from the first bus transmission line end section and the second bus transmission line end section towards the first middle bus transmission line section and the second middle bus transmission line section, where j is an integer that varies from 1 to N/2.

7. The interconnect bus recited in claim 1, wherein the component load resistance is substantially equal to $Z_o$.

8. The interconnect bus recited in claim 2, wherein the termination and the computer interconnect component are each electrically connected to a unique one of the plurality of nodes though a component connection transmission line section, the component connection transmission line sections having a characteristic impedance substantially equal to $Z_o$.

9. The interconnect bus recited in claim 8, wherein the termination has a termination resistance substantially equal to $Z_o$.

* * * * *